United States Patent
Lion et al.

(10) Patent No.: US 9,247,848 B2
(45) Date of Patent: Feb. 2, 2016

(54) TEMPERATURE-RETAINING DEVICE

(75) Inventors: Mathieu Lion, Paris (FR); Marc Simeray, Paris (FR)

(73) Assignee: MASTRAD, S.A., Paris (FR)

( * ) Notice: Subject to any disclaimer, the term of this patent is extended or adjusted under 35 U.S.C. 154(b) by 1288 days.

(21) Appl. No.: 12/784,396

(22) Filed: May 20, 2010

(65) Prior Publication Data
US 2011/0011554 A1 Jan. 20, 2011

Related U.S. Application Data (63) Continuation-in-part of application No. PCT/EP2008/009898, filed on Nov. 21, 2008.

(30) Foreign Application Priority Data

Nov. 21, 2007 (FR) ...................................... 07 08165

(51) Int. Cl.
- *H05B 6/80* (2006.01)
- *H05B 6/12* (2006.01)

(Continued)

(52) U.S. Cl.
CPC ........... *A47J 36/2494* (2013.01); *H05B 6/6491* (2013.01)

(58) Field of Classification Search
CPC ...... H05B 6/12; H05B 6/6491; H05B 6/6494; A47G 19/027; A47G 19/2288; A47J 36/027; A47J 36/2494; A47J 36/2444; A47J 47/145; Y10S 99/14
USPC ......... 219/730, 638, 633, 759, 620, 621, 634, 219/725, 732, 765, 727; 126/246, 375.1, 126/275, 400, 390; 438/455; 220/592.2; 165/10, 80.1, 80.5
See application file for complete search history.

(56) References Cited

U.S. PATENT DOCUMENTS

| | | | |
|---|---|---|---|
| 3,941,967 A | 3/1976 | Sumi et al. | 219/10.55 E |
| 4,422,129 A | 12/1983 | Briant et al. | 219/10.55 E |
| 4,542,271 A | 9/1985 | Tanonis et al. | 219/10.55 E |

(Continued)

FOREIGN PATENT DOCUMENTS

| | | |
|---|---|---|
| GB | 2274567 | 7/1994 |
| JP | 11-262439 | 9/1999 |

(Continued)

OTHER PUBLICATIONS

HotSmart Heat Retentive Plate, Juan Ramirez, Mar. 31, 2010, www.eatslowlysite.com/specs.

*Primary Examiner* — Hung D Nguyen
(74) *Attorney, Agent, or Firm* — Novak Druce Connolly Bove + Quigg LLP (57) ABSTRACT

A temperature-retaining device includes an upper wall and a lower wall. The upper wall includes a conduction plate having a top surface and a bottom surface comprising a plurality of downwardly projecting fingers. A temperature-retaining body is disposed in contact with the plurality of fingers to transfer heat from the temperature-retaining body to the conduction plate. A support structure is coupled to the upper wall and has a peripheral wall surrounding the temperature-retaining body. A lower wall is coupled to the support structure to enclose the temperature-retaining body within a cavity defined by the upper wall, support structure and lower wall. The lower wall comprises a gas-permeable channel that is substantially impermeable to liquids.

12 Claims, 5 Drawing Sheets

(51) Int. Cl.
*A47J 36/24* (2006.01)
*H05B 6/64* (2006.01)

(56) References Cited

U.S. PATENT DOCUMENTS

| | | | |
|---|---|---|---|
| 4,882,463 A * | 11/1989 | Kyougoku et al. | 219/727 |
| 4,917,076 A | 4/1990 | Nadolph et al. | 126/375 |
| 4,955,361 A * | 9/1990 | Sotani et al. | 126/351.1 |
| 5,117,999 A * | 6/1992 | Canzano et al. | 220/203.17 |
| 5,125,391 A | 6/1992 | Srivastava et al. | 126/246 |
| 5,478,988 A | 12/1995 | Hughes et al. | 219/730 |
| 5,508,498 A | 4/1996 | Rheinish et al. | 219/730 |
| 5,901,699 A * | 5/1999 | McDermott | 126/246 |
| 6,005,233 A | 12/1999 | Wyatt | 219/621 |
| 6,147,337 A | 11/2000 | Besser | 219/730 |
| 6,188,053 B1 * | 2/2001 | Wyatt | 219/620 |
| 6,196,409 B1 * | 3/2001 | Lake et al. | 220/371 |
| 6,501,057 B1 | 12/2002 | Jarvis | 219/621 |
| 6,774,346 B2 | 8/2004 | Clothier | 219/620 |
| 7,176,426 B2 | 2/2007 | Ramirez | 219/730 |
| D543,071 S | 5/2007 | Lion et al. | D7/367 |
| 7,304,279 B2 | 12/2007 | Isogai et al. | 219/685 |
| 2002/0096514 A1 | 7/2002 | Johnson et al. | 219/730 |
| 2003/0007833 A1 * | 1/2003 | Closkey | 404/25 |
| 2003/0218010 A1 | 11/2003 | Jang et al. | 219/730 |
| 2006/0219712 A1 * | 10/2006 | Ramirez | 219/730 |
| 2007/0034202 A1 | 2/2007 | Pumphrey et al. | 126/263.01 |
| 2008/0277400 A1 | 11/2008 | Welsh et al. | 220/592.2 |

FOREIGN PATENT DOCUMENTS

| | | |
|---|---|---|
| JP | 11-262439 A * | 9/1999 |
| KR | 10-0823837 | 4/2008 |
| WO | WO 94/17646 | 8/1994 |

* cited by examiner

TEMPERATURE-RETAINING DEVICE

CROSS-REFERENCE TO RELATED APPLICATIONS

This application is a continuation-in-part of International Application PCT/EP2008/009898, with an international filing date of Nov. 21, 2008, which in turn claims benefit of priority to French Patent Application No. 07 08165, filed Nov. 21, 2007, the contents of each of which are incorporated herein by reference in their entireties.

FIELD OF THE INVENTION

The present invention relates to a temperature-retaining device, and more particularly, to a device that is capable of retaining heat and cold to help maintain the desired temperature of food placed thereon.

BACKGROUND

One of the many challenges in food service is keeping prepared foods at a desired temperature. Hot foods often lose their texture and flavor when they are cooled and must therefore be served immediately upon preparation. This is often very difficult to do, particularly when food needs to be prepared in advance. On the other hand, it is preferred that certain other types of dishes, such as salads, be served cold. If such dishes are left outside of a refrigerator for any length of time, they will likely warm to room temperature, making them less palatable.

Various devices have been developed for keeping food at a desired temperature (hot or cold) after preparation. Heat lamps, for example, have been extensively used in fast food restaurants for keeping hamburgers and sandwiches warm before serving. Electric hot plates have also been used to keep foods warm. There are also buffet serving trays, which keep food warm by placing a heat source, such as a small flame, underneath the tray. The disadvantages of these devices, however, are that they are not easily portable and require either connection to an external power source or a potentially dangerous open flame to supply the heat. Similarly, cold packs and ice are the most common means used to keep cold dishes at a desired temperature. These methods, however, suffer the disadvantage of melting and creating a soggy mess. Moreover, separate devices or means are typically required to keep food either warm or cold.

It is therefore desirable to have a single device that is capable of keeping food either warm or cold. It is also desirable to have such a device that is easily portable and does not require connection to an external power source to supply the heat.

SUMMARY

The temperature-retaining devices disclosed herein have the advantages of being portable, generally safe and not requiring connection to an external power source. The temperature-retaining devices are typically made from materials that retain heat upon being exposed to microwave energy and that also optionally retain cold upon being refrigerated or stored in a freezer for a period of time, typically from 30 minutes to 24 hours.

One major disadvantage of some microwaveable hot plates is that they tend to swell and deform from repeated washing and heating in the microwave oven. This swelling and deformation is caused by the accumulation and heating of water molecules in the internal cavity of the hot plate and in the hot plate itself.

The embodiments disclosed herein provide for a temperature-retaining device that is configured to resist swelling and deformation upon repeated washing, exposure to water and extended use in the microwave oven.

In one preferred embodiment, the temperature-retaining device comprises an upper surface, a lower surface coupled to the upper surface, and a cavity defined between the upper and lower surfaces. A temperature-retaining body is disposed within the cavity. The temperature-retaining device also comprises a gas-permeable channel configured to inhibit, if not prevent, the passage of liquids into the cavity.

In accordance with one aspect of the preferred embodiment, the channel comprises one or more apertures. Preferably, a gas permeable membrane is coupled to the channel to permit the passage of gas into and out of the cavity. Preferably, the gas-permeable membrane covers the one or more apertures and is made of a material that inhibits, if not prevents, the passage of liquids into the cavity. The gas-permeable membrane may be made of a porous material, such as, for example, micro fiber, thermoplastic polymer, polytetrafluoroethylene, Goretex®, and polyester.

In accordance with another aspect of the preferred embodiment, the aperture has a diameter of about 0.5 mm to about 5 mm, and more preferably, from about 1 mm to about 2 mm. The channel may also comprise a plurality of apertures. Where a plurality of apertures is provided, the diameters of the apertures may be the same or they may differ. Preferably, the diameters of the apertures are in the range of about 0.5 mm to about 5 mm, and more preferably, from about 1 mm to about 2 mm.

In accordance with a further aspect of the preferred embodiment, an attachment piece may be provided to couple the gas-permeable membrane to the channel. The attachment piece may be shaped as a ring having a bore sleeved around an external surface of the channel.

In accordance with yet a further aspect of the preferred embodiment, the lower surface may further comprise a plurality of cells configured to insulate the temperature-retaining body from the external environment.

In another preferred embodiment, the temperature-retaining device comprises an upper wall, a lower wall and a support structure. The support structure comprises a peripheral wall and is coupled to the upper and lower walls to define an enclosed cavity. A temperature-retaining body is disposed within the cavity. A gas-permeable channel is configured to permit the passage of gases into and out of the cavity.

In accordance with one aspect of the preferred embodiment, the support structure may be made of a substantially rigid synthetic material which is permeable to microwave energy and which resists temperatures of above about 150° C. The support structure may further comprise a perforated top surface and a peripheral surface surrounding the top surface. The peripheral surface is preferably formed from thermally non-conductive material. The peripheral surface may further be shaped and configured to provide handles, which remain cool to the touch even when the temperature-retaining device is heated. In a preferred embodiment, the temperature-retaining device has at least two handles.

In accordance with another aspect of the preferred embodiment, the support structure may further comprise a recess disposed between the top surface and the peripheral surface. The recess is configured to allow dilation of the top surface upon exposure to radiation or heat. The recess may be disposed within the peripheral wall of the support structure.

Flexible strips may be disposed in the recess to buffer the peripheral surface from deformations and stresses experienced by the perforated surface and allow an air gap for providing further insulation for the temperature-retaining body.

In accordance with a further aspect of the preferred embodiment, a plurality of feet may be formed from the peripheral surface. The plurality of feet may be spaced apart and curved vertically downward to support the temperature-retaining device on a substantially flat contact surface. The plurality of feet is preferably configured to provide a space between the lower surface of the temperature-retaining device and the contact surface to allow air circulation therethrough.

In a further preferred embodiment, the heat-retaining device comprises an upper wall and a lower wall. The upper wall comprises a conduction plate having a top surface and a bottom surface comprising a plurality of downwardly projecting fingers. A heat retaining body is disposed in contact with the plurality of fingers to transfer heat the heat retaining body to the conduction plate. A support structure is coupled to the upper wall and comprises a peripheral wall surrounding the heat retaining body. A lower wall is coupled to the support structure to enclose the heat retaining body within a cavity defined by the upper wall, support structure and lower wall. The lower wall comprises a gas-permeable channel that is substantially impermeable to liquids.

In accordance with one aspect of the preferred embodiment, the support structure may further comprise a perforated top surface coupled to the peripheral wall. The perforated top surface may comprise cross holes through which the plurality of fingers may project through and contact the heat retaining body.

In accordance with another aspect of the preferred embodiment, the heat-retaining device may further comprise an insulating body disposed between the heat retaining body and the lower wall.

In accordance with a further aspect of the preferred embodiment, the heat-retaining device may further comprise a plurality of posts disposed between the heat retaining body and the peripheral wall of the support structure. The plurality of posts configured to space the heat retaining body from the peripheral wall. The posts may also be shaped to space and to maintain the heat retaining body at a distance from the insulating body to provide improved insulation of the temperature-retaining body from the environment.

In yet a further embodiment, a temperature-retaining device comprises an insulating casing, a temperature-retaining body, and a gas-permeable channel. The insulating casing comprises an upper external surface and defines an enclosed internal cavity. The temperature-retaining body is disposed in the internal cavity of the insulating casing. The channel is disposed in the insulating casing and is configured to inhibit the passage of liquids into the internal cavity.

In accordance with one aspect of the preferred embodiment, the temperature-retaining body is configured to retain heat upon being subjected to microwave energy. In a preferred embodiment, the temperature-retaining body may be heated to temperatures of about 220° C. to 250° C.

In accordance with another aspect of the preferred embodiment, the temperature-retaining body is configured to retain cold upon being cooled to a desired temperature. In a preferred embodiment, the temperature-retaining body may be cooled to a temperature of about −40° C.

In a further aspect of the preferred embodiment, the upper external surface of the insulating casing is made substantially of silicone.

In yet a further aspect of the preferred embodiment, a plurality of gaps are defined between the internal cavity of the insulating cavity and the temperature-retaining body.

The yet a further aspect of the preferred embodiment, the channel comprises a valve to permit the passage of gas into and out of the cavity, while at the same time preventing the passage of liquids into the cavity. In a preferred embodiment, the valve is made of PFTE.

Other objects, features and advantages of the present invention will become apparent to those skilled in the art from the following detailed description.

BRIEF DESCRIPTION OF THE DRAWINGS

Illustrative embodiments of the present invention are described herein with reference to the accompanying drawings, in which.

Like numerals refer to like parts throughout the several views of the drawings.

DETAILED DESCRIPTION OF THE PREFERRED EMBODIMENTS

Embodiments of the present invention are directed to temperature-retaining devices which are capable of being heated in a microwave oven and which retain heat for an extended period of time. The temperature-retaining devices may also be refrigerated, frozen or otherwise subjected to cold temperatures to retain the cold for an extended period of time and also function as a cold plate. The temperature-retaining devices are configured to resist deformation and swelling resulting from prolonged exposure to heat and repeated washings.

Hot plates that are subjected to repeated exposure to microwave energy may be susceptible to deformation and swelling. This is, in large part, due to the absorption of water by certain resins and other materials used to construct the hot plates. The absorption of water, in turn, may even cause the hot plate material to melt or to create a condition of excessive pressure inside the cavity that may cause damage or an explosion of the hotplate.

The embodiments of the temperature-retaining devices disclosed herein are constructed from materials that retain and transfer heat or cold by conduction. Moreover, the temperature-retaining devices disclosed herein are configured such that they are capable of releasing the stresses experienced during heating or cooling. Significantly, a gas-permeable membrane is provided that allows the passage of gas into and out of the cavity of the temperature-retaining devices, while preventing water from entering the cavity.

Figure 1A:
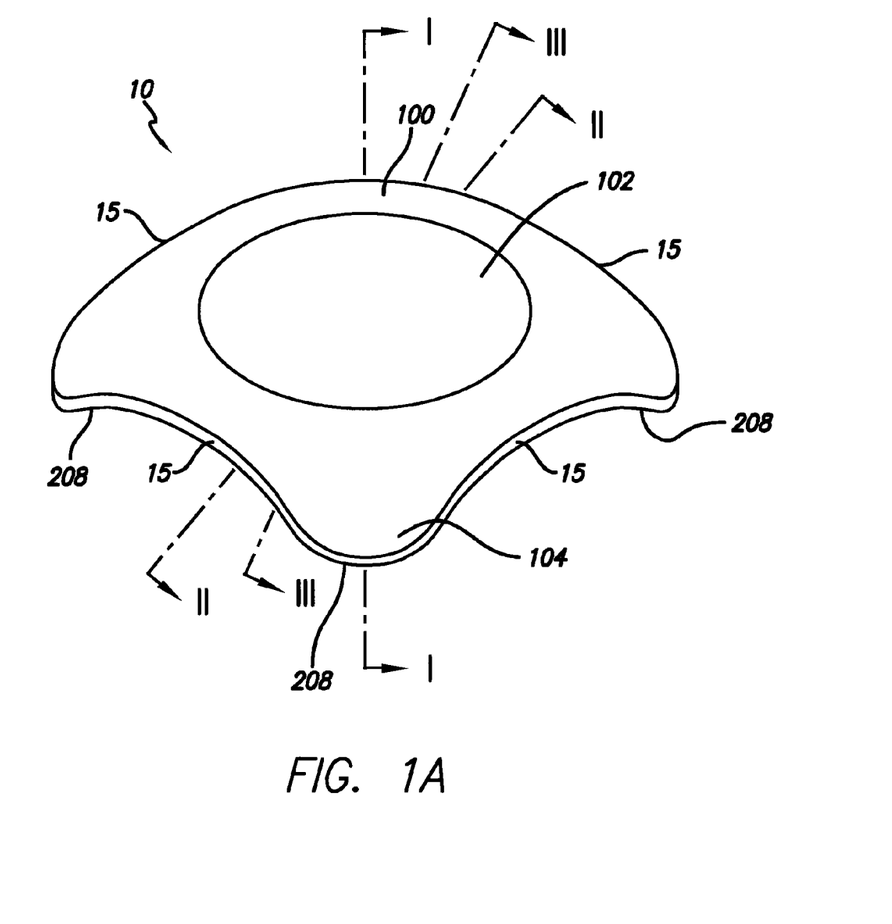
FIG. 1A is a perspective view of an embodiment of an assembled temperature-retaining device.
Figure 1B:
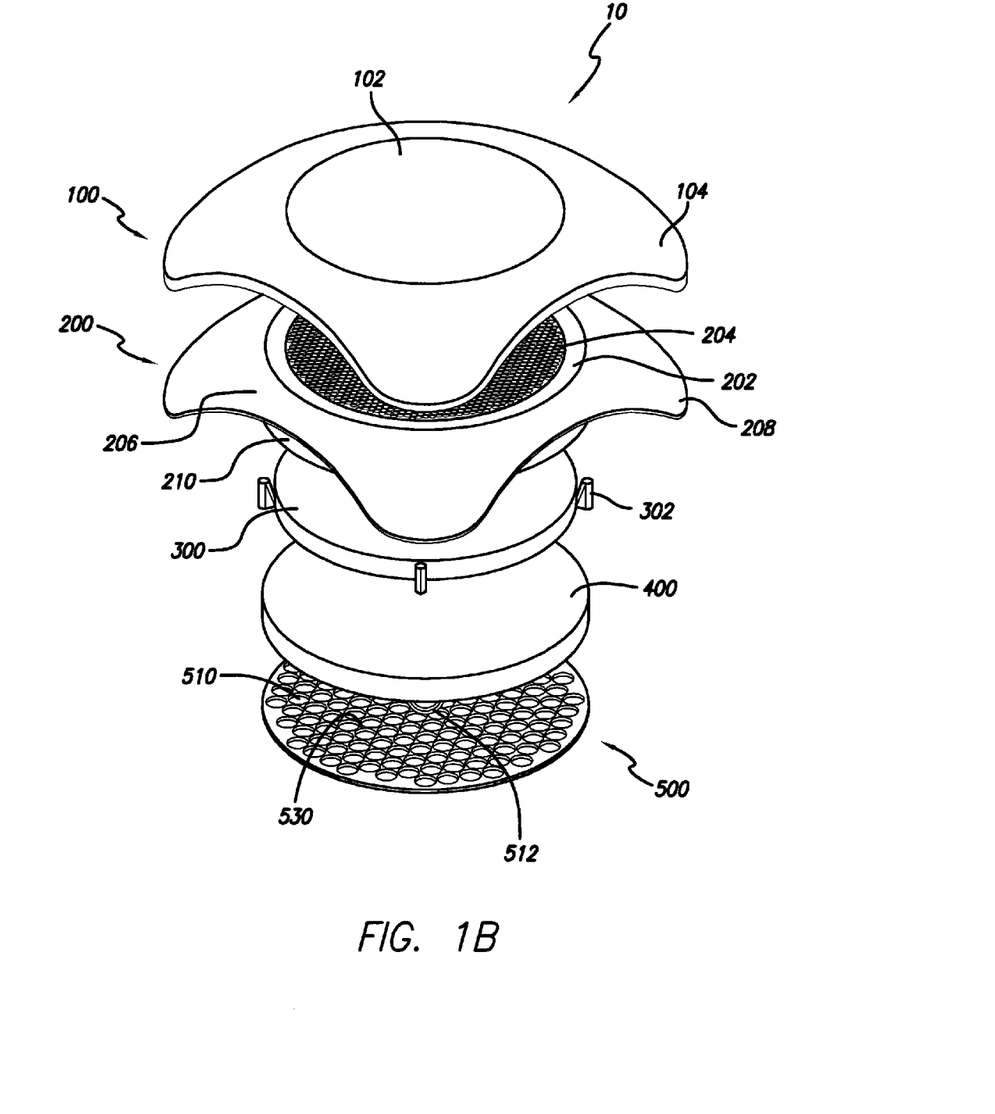
FIG. 1B is an exploded perspective view of the temperature-retaining device of FIG. 1A.

FIGS. 1A and 1B illustrate a preferred embodiment of the temperature-retaining device 10. The temperature-retaining device 10 comprises an upper surface 100, a support structure 200, a temperature-retaining body 300, an insulating body 400, and a lower surface 500. The temperature-retaining device 10 may further comprise a plurality of handles 15 configured to allow a user to grip the temperature-retaining device 10. The handles 15 are preferably shaped to remain cool to the touch, even when the temperature-retaining device 10 is heated or cooled.

The upper surface 100 is permeable to microwave energy and includes a conduction plate 102 on top of which food may be supported. An upper periphery 104 surrounds the conduction plate 102 and may be made of the same or different material as the conduction plate 102. The upper surface 100 is disposed on top of the support structure 200 and is preferably made of heat-resistant silicone, such as, for example, HCR silicone 50 with a Shore A hardness of about 50 or 60. Preferably, the silicone material has a Shore A hardness in the range of about 40 to about 85. The use of silicone for the upper surface provides certain advantages to the temperature-retaining device 10. It not only absorbs heat, it releases heat slowly over time. It also provides an anti-slip surface to prevent items placed thereon from slipping. It is also an insulating material that allows microwaves to pass to the temperature-retaining body.

Figure 7:
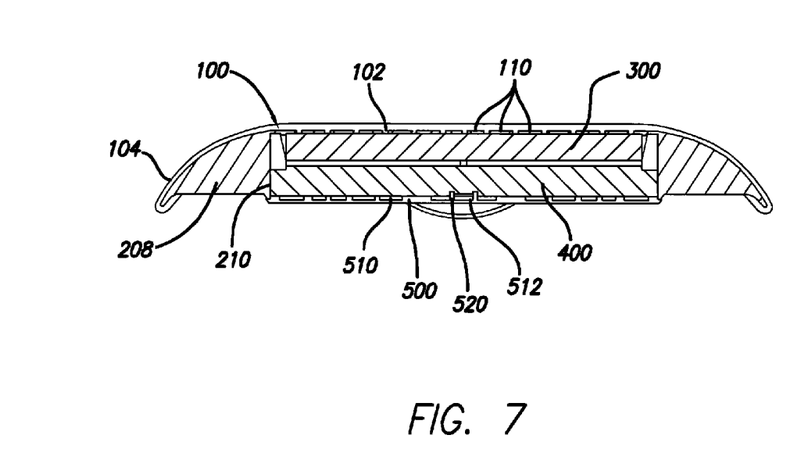
FIG. 7 is a cross-sectional view of another embodiment of the temperature-retaining device taken along I-I of FIG. 1.

The support structure 200 is disposed below the upper surface 100 and is permeable to microwave energy. The support structure 200 comprises a perforated top surface 202, a peripheral surface 206 surrounding the top surface 202 and a peripheral wall 210. The top surface 202 comprises a plurality of cross holes 204 which are configured to accommodate a plurality of fingers (not shown) that project downward from the underside of the upper surface 100. In an alternate embodiment, as shown in FIG. 7, the support structure 200 may be provided without the perforated top surface 202 so as to permit direct contact between the conduction plate 102 and the temperature-retaining body 300.

The peripheral surface 206 preferably has a plurality of feet 208 that is formed as curved vertical pieces. The feet 208 improve the stability of the temperature-retaining device 10 when it is placed on a substantially flat surface, such as for example a floor or a table. The feet 208 further dispose the lower surface 500 at a distance above the surface so as to provide a space for air circulation. The feet 208 are preferably spaced apart from one another by more or less equal angular sectors. For example, the peripheral surface 206 may include three and four descending curved feet 208 located 90° and 120°, respectively, from one another. In the preferred embodiment depicted in FIGS. 1A and 1B, the upper periphery 104 may be extended to cover the plurality of feet 208.

The support structure 200 may be made of synthetic material that is resistant to high temperatures, such as mineral- or fiberglass-reinforced polyesters, reinforced polybutylene terephthalate (PBT), polyethylene terephthalate (PET), a reinforced alloy of PBT and PET, a high-temperature polymer, such as polycarbonate (PC), polyetherether ketone (PEEK), polyether imide (PEI), polyether sulfone (PES), polysulfone (PSU) or liquid crystal polymer (LCP).

The temperature-retaining body 300 is at least partially seated within the support structure 200. While FIG. 1 depicts the conduction plate 102, the perforated top surface 202 and the heat accumulation body 300 as having a circular shape, it is understood that they may be configured in other shapes and dimensions. In a preferred embodiment, the temperature-retaining body 300 is made of various kinds of ceramics which are reinforced with mineral elements, such as, for example, ferrite or ferromagnetic materials. Such materials are capable of heating to high temperatures up to a Curie point (Tc) when subjected to microwave energy. The temperature-retaining body 300 becomes heated upon exposure to microwave energy. In a preferred embodiment, the temperature-retaining body 300 is heated in a microwave for about 1-10 minutes, preferably 1-5 minutes, and most preferably for about 3 minutes. Once heated, the temperature-retaining body 300 is capable of retaining heat for an extended period of time. The preferred embodiment of the heat-retaining device is capable of retaining heat for at least one hour. The retained heat is transferred from the temperature-retaining body 300 to the conduction plate 102 of the upper surface.

A plurality of posts 302 may be spaced apart and disposed around the periphery of the temperature-retaining body 300. For example, three or four posts may be provided, spaced 90° or 120° from one another, respectively. The posts 302 may be made from any suitable material, preferably heat resistant, such as reinforced PBT or silicone having a Shore A hardness of over 80. As illustrated in FIG. 1, the posts 302 may have an inverted V-shape in order to stabilize the temperature-retaining body 300 within the peripheral wall 210 with a wide dimensional tolerance. The posts 302 also space apart the temperature-retaining body 300 from the upper surface of the insulating body 400 to provide further insulation for the temperature-retaining body 300.

An insulating body 400 may be disposed underneath the temperature-retaining body 300. The insulating body 400 may be made from any nontoxic insulating material. Examples of such material include fibers, such as $SiO_2$—$Al_2O_3$—$ZrO_2$-based materials, ceramic and cerablanket (ALFISO® 1260/128 or ALFISO® 1260/96). The insulating body 300 is also at least partially seated within the support structure 200.

The lower surface 500 is coupled to the peripheral wall 210 of the support structure 200 and forms the bottom surface of the temperature-retaining device 10. Thus, an internal cavity is defined and bounded by the upper surface 100, the peripheral wall 210 of the support structure 200, and the lower surface 500. While several components are described as coming together to form the internal cavity, it is understood that the internal cavity may be formed by a single integral structure. The heat-retaining body 300 and the insulating body 400 are disposed within this cavity. The lower surface 500 comprises a plurality of cells 510 and a channel 512. The cells 510 insulate the insulating body 400 by conduction from the external environment and the channel 512 permits the passage of gases into and out of the hot plate cavity, while substantially preventing the entry of liquids into the cavity.

Figure 2:
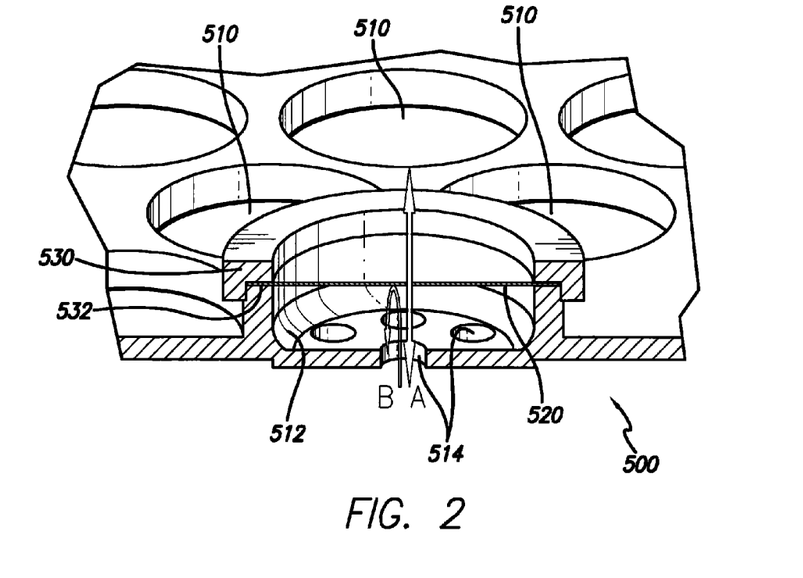
FIG. 2 is a partial perspective and cross-sectional view of the lower surface of the temperature-retaining device of FIG. 1 taken along I-I.

FIG. 2 shows a portion of the lower surface 500 in greater detail. In the embodiment depicted in FIGS. 1 and 2, a single channel 512 is disposed at the center of the lower surface 500. A plurality of cells 510 is also disposed in the lower surface 500 to provide insulation. Although FIGS. 1 and 2 depict the lower surface 500 as having a single channel 512, it is understood that the lower surface 500 may comprise any number of channels 512 as appropriate. Moreover, while FIGS. 1 and 2 depict the channel 512 as being disposed on the lower surface 500, it is understood that the channel 512 may be located on any surface that defines the internal cavity.

Figure 6:
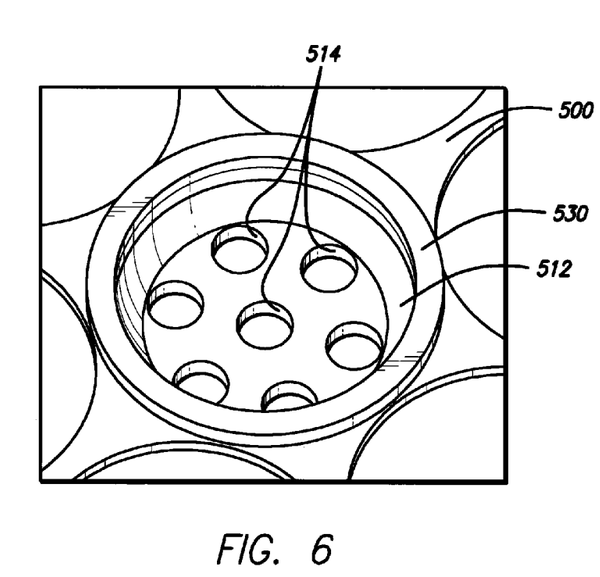
FIG. 6 is a perspective view of the channel disposed in the lower wall of the temperature-retaining device of FIG. 1.

In a preferred embodiment, the channel 512 has a cylindrical shape and at least one aperture 514 disposed in the bottom surface of the channel 512. In another preferred embodiment, the channel 512 may have a plurality of apertures 514, as shown in FIGS. 2 and 6. The plurality of apertures 514 may have the same diameter or they may have differing diameters. The apertures 514 preferably have a diameter from about 0.5 mm to about 5 mm, and more preferably from about 1 mm to about 2 mm.

A gas-permeable membrane 520 is coupled to the upper surface of the channel 512 and closes off the channel 512. The membrane 520 may be made from a porous material such as microfiber, thermoplastic polymer, polytetrafluorethylene, Goretex®, or polyester. The membrane 520 may also be laminated with a support fabric, such as, for example, polyester, to ensure improved mechanical resistance. Preferably, the membrane 520 is made of a material that inhibits, if not prevents, the passage of liquids into the cavity. As schematically illustrated in FIG. 2, the membrane 520 allows gases A to pass into and out of the cavity in such a way to ensure pressure equilibrium with the external environment when the temperature-retaining device 10 is subjected to heat, while limiting and preferably preventing the entrance of liquids B into the internal cavity. Because the membrane 520 is gas-permeable, it permits the discharge of water vapors from inside the cavity to outside the temperature-retaining device 10.

An attachment piece 530 may be used to couple the membrane 520 to the channel 512. As depicted in FIGS. 2 and 6, the attachment piece 530 is preferably formed as a revolving ring having an internal diameter that is more or less equal to the diameter of the channel 512 over which it is fitted. The attachment piece 530 may have a bore sleeved around an external surface of the channel 512. In addition to immobilizing the membrane 520 to the channel 512, the attachment piece 530 is particularly desirable where the membrane 520 material is fragile and consequently difficult to handle. In this case, the membrane 520 may be soldered or glued to the attachment piece 530 and then assembled onto the channel 512. An adhesive layer 532 may further be provided between the peripheral edge of the membrane 520 and the channel 512. The attachment piece 530 may also be forcibly embedded or welded to ensure a hermetic seal between the attachment piece 530 and the channel 512.

Figure 3:
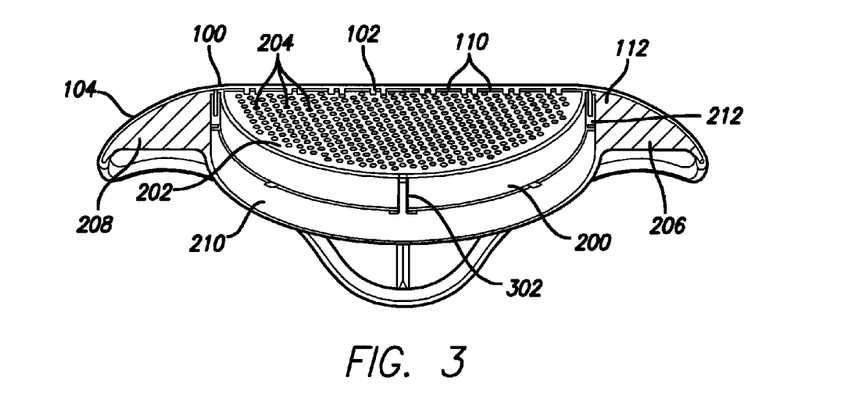
FIG. 3 is a partial perspective and cross-sectional view of the temperature-retaining device of FIG. 1, partially assembled with the upper surface and parts of the peripheral surface cut away along I-I.

FIG. 3 depicts the temperature-retaining device 10 showing a perspective cross-sectional cutaway view of the upper surface 100 disposed on top of the support structure 200. As shown in FIG. 3, the support structure 200 comprises a perforated top surface 202 that permits heat or cold conduction from the temperature-retaining body 300 to the conduction plate 102. The perforated top surface 202 also accommodates a plurality of fingers 110 that project downwardly from the upper surface 100 and through the cross holes 204 of the perforated top surface 202 to contact the temperature-retaining body 300.

The fingers 110 provide direct contact between the conduction plate 102 and the temperature-retaining body 300 to enhance the transfer of heat or cold. Thus, the amount of heat or cold transferred from the temperature-retaining body 300 to the conduction plate 102 may be controlled by the number of fingers 110 provided in the upper surface 100. In a preferred embodiment, the perforated top surface comprises a greater number of cross holes 204 than the number of fingers 110.

Figure 4:
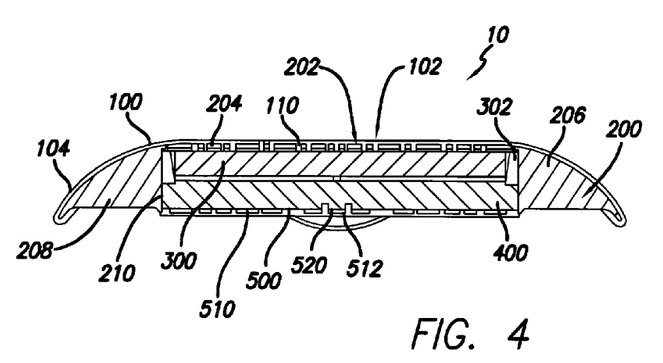
FIG. 4 is a cross-sectional view of the assembled temperature-retaining device of FIG. 1 taken along I-I.

An axial wall 112 surrounding the support structure 200 may be coupled to the upper surface 100. The axial wall 112 may provide a heat barrier to limit the transfer of heat or cold radially away from the temperature-retaining body 300. Preferably, the axial wall 112 is fashioned from the same material as the upper surface and is constructed as an integral structure FIG. 4 is a cross-sectional view of the assembled temperature-retaining device 10. The upper surface 100, the lower surface 500 and the peripheral wall 210 of the support structure 200 define an interior cavity of the temperature-retaining device 10. The temperature-retaining body 300 and the insulating body 400 are disposed within the hot plate cavity.

The upper surface 100 is depicted as covering the entire top surface of the temperature-retaining device 10 and the lower surface 500 is depicted as providing the base or bottom of the temperature-retaining device 10. The peripheral wall 210 laterally delimits the cavity of the temperature-retaining device. As shown in FIG. 4, the temperature-retaining body 300 and insulating body 400 are completely enclosed within the cavity of the temperature-retaining device.

As shown in FIG. 4, the plurality of fingers 110 project downwardly from the upper surface 100, through the cross holes 204 of the perforated top 202 of the support structure 200, and contacts the temperature-retaining body 300. A plurality of posts 302 are disposed between the temperature-retaining body 300 and the peripheral wall 210 to stabilize and space apart the temperature-retaining body 300 within the cavity. The posts 302 are further dimensioned to have a wider base to space apart the temperature-retaining body 300 from the insulating body 400. The plurality of cells 510 disposed on the lower surface 500 provide insulating zones in each of the cells 510 so as to reduce heat exchange and thus provide insulation from the external environment.

Figure 5A:
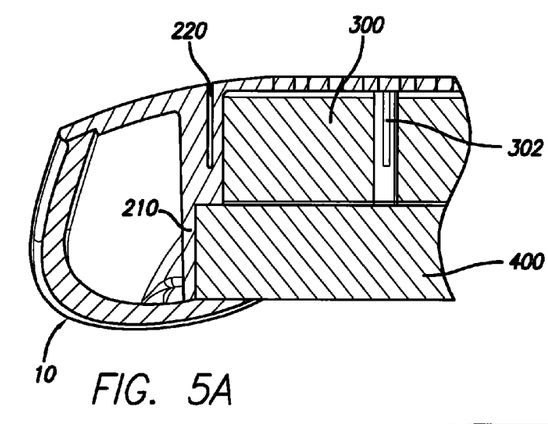
FIG. 5A is a partial cross-sectional view of the temperature-retaining device of FIG. 1 taken along II-II.
Figure 5B:
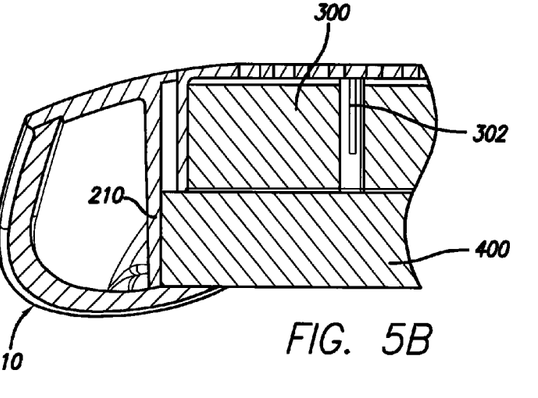
FIG. 5B is a partial cross-sectional view of the temperature-retaining device of FIG. 1 taken along III-III.

FIGS. 5A and 5B are partial cross-sectional views of embodiments of the temperature-retaining device 10 taken along II-II and III-III, respectively. FIGS. 5A and 5B show the peripheral wall 210 surrounding the temperature-retaining body 300 and the insulating body 400 and a post 302 interposed between the temperature-retaining body 300 and the peripheral wall 210. FIG. 5A further shows an annular recess 220 disposed in the peripheral wall 210. The recess 220 may be provided to partially decouple the top surface 202 from the peripheral surface 206 and therefore relieve the mechanical stress experienced by the perforated top surface 202 when the temperature-retaining device 10 is heated. Optionally, the recess 220 may include flexible strips to absorb or buffer the deformations and stresses experienced by the support structure 200. The width of the peripheral wall 210 may be thicker so as to accommodate the recess 220. Moreover, the diameter of the temperature-retaining body 300 may be smaller than the diameter of the insulating body 400 to further accommodate the increased width of the peripheral wall.

FIG. 7 shows yet another embodiment of the temperature-retaining device 10 in which the support structure 200 comprises a peripheral surface 206 formed into feet 208 and a peripheral wall 210. Notably, the support structure does not include the perforated top surface and therefore the fingers 110 projecting downwardly from the conduction plate 102 of the upper surface 100 directly contact the temperature-retaining body 300 without an intervening structure. The upper surface further comprises an upper periphery 104 that completely covers the feet 208 of the support structure 200 so as to provide a continuous top surface. The lower surface 500 is coupled to the support structure 200, preferably at the peripheral wall 210 so as to define an enclosed cavity. The temperature-retaining body 300 and the insulating body 400 are disposed within the enclosed cavity, with the channel 512 having a membrane 520 that allows ingress and egress of gases between the enclosed cavity and the external environment. As previously described, the membrane 520 substantially, if not completely, prevents the entry of liquids into the enclosed cavity.

The temperature-retaining device described and illustrated herein may be manufactured and assembled in any number of ways. One exemplary method of assembling the hot plate comprises joining the bottom of the upper surface 100 with the top of the perforated top surface 202, making sure that the plurality of fingers 110 are passed through the cross holes 204. The upper surface 100 may be joined to the support structure 200 in this manner by, for example, over molding, gluing, and/or fastening. Preferably, the coupling of the upper surface 100 to the support structure 200 is air tight.

Next, the temperature-retaining body 300 is lodged inside the internal cavity of the structure 200. The top surface of the temperature-retaining body 300 is joined to the free ends of the fingers 110 of the upper surface 100 and also to the bottom surface of the perforated top surface 202. Again, the coupling of the temperature-retaining body 300 to fingers 110 and the perforated top surface 202 may be done by gluing.

Optionally, posts 302 may be pushed in between the peripheral edge of the temperature-retaining body 300 and the internal surface of the peripheral wall 210. The posts 302 are intended to immobilize the temperature-retaining body 300 in relation to the peripheral wall 210. The posts 302 may be glued onto the internal surface of the peripheral wall 210 and/or to the temperature-retaining body 300. Preferably, the posts 302 are spaced apart from one another by more or less equal angular sectors. For example, four posts 302 spaced 90° from one another or three posts 302 spaced 120° from one another. Moreover, the posts 302 may be made from a reinforced PBT or a silicone material having a Shore A hardness of over 80.

The insulating body 400 may then be lodged inside the internal cavity of the support structure 200 in such a way that its top surface is facing the bottom surface of the temperature-retaining body 300. The posts 302 may also be used to keep the top surface of the insulating body 400 at a certain distance from the bottom surface of the temperature-retaining body 300 with a dimensional tolerance.

The lower surface 500 is assembled by gluing or otherwise attaching the membrane 520 to the attachment piece 530. The attachment piece 530 and membrane 520 are then attached to the channel 512. An adhesive may be provided between the surface of the channel 512 and the membrane 520 to further secure the attachment piece 530 and membrane 520 to the channel 512. According to the preferred embodiments disclosed herein the temperature-retaining device 10 is depicted and described as having a single channel 512. It is understood, however, that the temperature-retaining device 10 may comprise any number of channels 512 as is appropriate.

The lower surface 500 is then placed underneath the insulating body 400 and is joined to the peripheral wall 210 of the support structure 200 in such a way as to be hermetically sealed. Again, the lower surface 500 may be joined to the peripheral wall 210 by gluing or soldering.

The aforementioned gluing may be done using an acrylic or silicone type glue such as, for example, Dow Corning® 8888. With respect to the membrane 520, a glue of high temperature cyanoacrylate type or a silicone glue may be used.

It is understood that the above-described steps may be performed in different order or, in some instances, simultaneously. Moreover, when the support structure 200 does not include a perforated top surface 202, the top surface of the temperature-retaining body 300 may be joined to the bottom of the upper surface 100.

An optional spring blade of memory alloy, such as nickel/titanium, may further be provided to displace the temperature-retaining body 300 from the conduction plate 102 of the upper surface 100. In a preferred embodiment, the displacement is about 5 mm. This results in a decrease in conduction between the temperature-retaining body 300 and the conduction plate 102 and therefore a slowing of heat loss from the temperature-retaining body 300.

It is to be understood that the detailed description and specific examples, while indicating preferred embodiments of the present invention, are given by way of illustration and not limitation. Many changes and modifications within the scope of the present invention may be made without departing from the spirit thereof, and the invention includes all such modifications.

What is claimed is:

1. A temperature-retaining device comprising:
   an upper wall;
   a lower wall;
   a support structure comprising a peripheral wall and coupled to the upper and lower walls to define an enclosed cavity;
   a temperature-retaining body disposed within the cavity with space between the temperature-retaining body and the lower wall and between the temperature-retaining body and the peripheral wall, the temperature-retaining body being displaced from the lower wall;
   an insulating body at least coextensive with the temperature-retaining body and disposed between the temperature-retaining body and the lower wall with an air gap between the insulating body and the temperature-retaining body; and
   an aqueous gas-permeable and liquid-impermeable channel in communication with the cavity and including one or more apertures and at least one aqueous gas-permeable and liquid inhibiting or impermeable element closing the one or more apertures.

2. The temperature-retaining device of claim 1, wherein the support structure is made of a substantially rigid synthetic material which is permeable to microwave energy and which resists a temperature above about 150° C.

3. The temperature-retaining device of claim 1, the support structure further comprising a perforated top surface and a peripheral surface surrounding the top surface.

4. The temperature-retaining device of claim 3 further comprising a recess disposed between the top surface and the peripheral surface, wherein the recess is configured to allow dilation of the top surface upon exposure to radiation or heat.

5. The temperature-retaining device of claim 4, wherein the recess is disposed within the peripheral wall of the support structure.

6. The temperature-retaining device of claim 4 further comprising flexible strips configured to buffer the peripheral surface from deformations and stresses experienced by the perforated surface and to allow an air gap for insulating the temperature-retaining body.

7. The temperature-retaining device of claim 3 further comprising a plurality of feet formed from the peripheral surface, the plurality of feet spaced apart and curved vertically downward to support the temperature-retaining device on a substantially flat contact surface.

8. The temperature-retaining device of claim 7, wherein the feet is configured to space the lower surface from the contact surface to allow air circulation.

9. The temperature-retaining device of claim 3, wherein the peripheral surface is formed of thermally non-conductive material and is configured to provide handles for the temperature-retaining device.

10. The temperature-retaining device of claim 9, wherein the peripheral surface is configured to provide at least two handles.

11. The temperature-retaining device of claim 1 further comprising:
- a recess disposed between the upper wall and the peripheral wall, the recess being configured to allow dilation of the upper wall.

12. The temperature-retaining device of claim 1 further comprising:
- heat conductive fingers extending between the upper wall and the temperature-retaining body; the temperature-retaining body being displaced from the upper wall.

* * * * *